(12) United States Patent  
Mitsui et al.

(10) Patent No.: US 12,139,949 B2  
(45) Date of Patent: Nov. 12, 2024

(54) HINGE

(71) Applicant: MITSUBISHI STEEL MFG. CO., LTD., Tokyo (JP)

(72) Inventors: Yasuhiro Mitsui, Ichihara (JP); Toru Hirokane, Ichihara (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 171 days.

(21) Appl. No.: 17/601,193

(22) PCT Filed: Jun. 1, 2020

(86) PCT No.: PCT/JP2020/021516  
§ 371 (c)(1),  
(2) Date: Oct. 4, 2021

(87) PCT Pub. No.: WO2021/005917  
PCT Pub. Date: Jan. 14, 2021

(65) Prior Publication Data  
US 2022/0162892 A1  May 26, 2022

(30) Foreign Application Priority Data  
Jul. 9, 2019  (JP) .................................. 2019-127342

(51) Int. Cl.  
*E05D 15/00* (2006.01)  
*E05D 3/18* (2006.01)  
(Continued)

(52) U.S. Cl.  
CPC .............. *E05D 3/18* (2013.01); *E05F 1/1083* (2013.01); *F16C 11/04* (2013.01);  
(Continued)

(58) Field of Classification Search  
CPC ........ G06F 1/16; G06F 1/1616; G06F 1/1681; G06F 1/166; G06F 1/1679; G06F 1/1083;  
(Continued)

(56) References Cited

U.S. PATENT DOCUMENTS 7,203,997 B2 *  4/2007  Morgan .................... E05D 3/18  
                                                              16/369  
8,281,459 B2 * 10/2012  Le ........................... E05D 3/022  
                                                              16/361  
(Continued)

FOREIGN PATENT DOCUMENTS

CN       101463863       6/2009  
CN       105822659       8/2016  
(Continued)

OTHER PUBLICATIONS

International Search Report and Written Opinion for International Application PCT/JP2020/021516 mailed Aug. 8, 2020.

*Primary Examiner* — Chuck Y Mah  
(74) *Attorney, Agent, or Firm* — Carlson, Gaskey & Olds, P.C.

(57) ABSTRACT

Hinge (10) includes first case (11) having an insertion hole through which a first hinge shaft (17) is inserted and a guide groove guiding first link shaft (23), second case (12) having a first insertion hole and a second insertion hole through which second hinge shaft (19) and third hinge shaft (21) are respectively inserted and a guide groove guiding second link shaft (25), and a link mechanism that maintains intervals between first hinge shaft (17), second link shaft (25) and center shaft (27), intervals between second hinge shaft (19), first link shaft (23), and center shaft (27), and intervals between third hinge shaft (21), first link shaft (23), and center shaft (27), and a first member and a second member are supported with first case (11) and second case (12)

(Continued)

respectively such that the first member and the second member are rotatable about a virtual rotation axis.

10 Claims, 17 Drawing Sheets

(51) Int. Cl.
    *E05F 1/10*     (2006.01)
    *F16C 11/04*     (2006.01)
    *G06F 1/16*     (2006.01)
    *H04M 1/04*     (2006.01)

(52) U.S. Cl.
    CPC ......... *E05Y 2999/00* (2024.05); *G06F 1/1681* (2013.01); *H04M 1/04* (2013.01)

(58) Field of Classification Search
    CPC .. H04M 1/022; H04M 1/0214; H04M 1/0216; H04M 1/0222; H04M 1/04; H05K 5/0226; F16C 11/04; F16M 11/10; E05D 11/105; E05D 11/1021; E05D 11/1078; E05D 11/082; E05D 3/14; E05D 3/18; E05D 3/122; E05D 3/12; E05D 3/16; E05D 3/06; E05D 3/32; E05D 15/28; E05D 15/30; E05D 15/32; E05D 15/40; E05D 1/04; E05D 2001/045; E05Y 2900/606
    See application file for complete search history.

(56) References Cited

U.S. PATENT DOCUMENTS

| | | | |
|---|---|---|---|
| 10,401,917 B1* | 9/2019 | Dai | H04M 1/022 |
| 2018/0230726 A1* | 8/2018 | Chen | E05D 11/10 |
| 2018/0239400 A1* | 8/2018 | Lin | E05D 11/06 |
| 2019/0145457 A1* | 5/2019 | Hsu | F16C 11/04 |
| | | | 16/368 |
| 2019/0368251 A1* | 12/2019 | Huang | G06F 1/1681 |
| 2020/0392983 A1* | 12/2020 | Chang | G06F 1/1681 |
| 2020/0401193 A1* | 12/2020 | Hsu | F16M 11/22 |
| 2020/0409427 A1* | 12/2020 | Hsu | E05D 1/04 |
| 2021/0207414 A1* | 7/2021 | Wong | E05D 3/186 |
| 2022/0070285 A1* | 3/2022 | Ge | G06F 1/1652 |
| 2022/0086265 A1* | 3/2022 | Shang | H04M 1/0268 |

FOREIGN PATENT DOCUMENTS

| | | |
|---|---|---|
| DE | 102012111508 | 5/2013 |
| EP | 1857624 | 11/2007 |
| JP | H5-52181 U | 7/1993 |
| JP | H6-28156 U | 4/1994 |
| JP | 2015194242 | 11/2015 |
| WO | 2014088615 | 6/2014 |
| WO | 2014160620 | 10/2014 |

* cited by examiner (a)

(b)

(a)

(b)

(c)

(a)

(b)

(c)

(a)

(b)

(c)

(a)

(b)

(a)

(b)

(a)

(b)

HINGE

TECHNICAL FIELD

The present invention relates to a hinge that supports a first member and a second member such that the first and second members are rotatable about a virtual rotation axis.

BACKGROUND ART

Conventionally, an electronic device such as a mobile phone or a notebook computer has been provided in which two housings are connected each other in a foldable manner, and while a display such as an LCD is provided on an inner surface of one of the housings, an manipulation unit such as a push button or a keyboard is provided on an inner surface of the other of the housings. In such the foldable electronic device, a shaft as a rotation axis of a hinge provided to a connecting portion is sometimes protruded from the inner surfaces of the housings. On the other hand, proposed is a hinge that rotatably connects a first member and a second member each other for an electronic device without requiring a shaft as a rotation axis (see Patent Documents 1 and 2).

PRIOR ART DOCUMENTS

Patent Documents

Patent Document 1: JP 2015-518190 A
Patent Document 2: JP 2016-516952 A

SUMMARY OF THE INVENTION

Problem to be Solved by the Invention

In a foldable electronic device, a shaft of a hinge provided at a connecting portion protrudes from an inner surface of a housing, and accordingly, an effective area of the inner surface of the housing is decreased or a design is limited sometimes. A hinge without a shaft as a rotation axis described in Patent Literatures 1 and 2 has a structure in which C-shaped pivot portions or hinge rings slide and rotate relative to arc-like grooves or hinge frames in a cross-section orthogonal to the rotation axis, and thus, it is difficult to generate a click at a predetermined rotation angle.

The present invention is made in view of the above problems, and an object of the present invention is to provide a hinge that can generate a click with sufficient strength at a predetermined rotation angle without causing a shaft to be protruded from an inner surface of a connecting portion of a foldable housing.

Means for Solving the Problem

In order to solve the above problem, a hinge according to the present application is a hinge that supports a first member and a second member such that the first member and the second member are rotatable about a virtual rotation axis, and the hinge includes a first case attached with the first member, the first case including an insertion hole through which a first hinge shaft parallel to the virtual rotation axis is inserted, and a guide groove that guides a first link shaft parallel to the virtual rotation axis, a second case attached with the second member, the second case including an insertion hole through which a second hinge shaft parallel to the virtual rotation axis is inserted, and a guide groove that guides a second link shaft parallel to the virtual rotation axis, and a link mechanism that maintains intervals between the first hinge shaft, the second link shaft, and a center shaft parallel to the virtual rotation axis, and intervals between the second hinge shaft, the first link shaft, and the center shaft, and in the hinge, the first case, the second case, and the link mechanism are connected by the first hinge shaft, the second hinge shaft, the first link shaft, the second link shaft, and the center shaft.

The guide groove of the first case and the guide groove of the second case may be shaped to be symmetrical in a plane passing through the virtual rotation axis and an axis of the center shaft. An axis of the first hinge shaft, an axis of the second hinge shaft, an axis of the first link shaft, an axis of the second link shaft, and the axis of the center shaft may be arranged to be symmetrical in the plane passing through the virtual rotation axis and the axis of the center shaft.

The guide groove of the first case and the guide groove of the second case may guide the first link shaft and the second link shaft respectively along a predetermined path in a plane orthogonal to the virtual rotation axis so that the first case and the second case may be rotatable about the virtual rotation axis. The first case and the second case may be synchronized such that the first case and the second case are symmetrical in the plane passing through the virtual rotation axis and the axis of the center shaft, irrespective of a rotation angle.

The link mechanism may include a first plate that maintains the intervals between the first hinge shaft, the second link shaft, and the center shaft, and a second plate that maintains the intervals between the second hinge shaft, the first link shaft, and the center shaft.

The first case may further include a stopper that limits a rotation angle of the first plate about the first hinge shaft inserted into the insertion hole of the first case to be in a predetermined range, and the second case may further include a stopper that limits a rotation angle of the second plate about the second hinge shaft inserted into the insertion hole of the second case to be in a predetermined range.

The hinge may further include a first torque generating mechanism that generates the torque for the rotation between the first case and the first plate about the first hinge shaft and a second torque generating mechanism that generates the torque for the rotation between the second case and the second plate about the second hinge shaft. Each of the first torque generating mechanism and the second torque generating mechanism may include a leaf spring or a disc spring as energizing means.

The second case may further include a second insertion hole through which a third hinge shaft parallel to the virtual rotation axis is inserted, the third hinge shaft being coaxial with the second hinge shaft, and the link mechanism may further include a third plate that maintains intervals between the third hinge shaft, the first link shaft, and the center shaft, and a fourth plate that maintains the interval between the second link shaft and the center shaft.

The link mechanism may further include a third plate that maintains the interval between the first link shaft and the center shaft, and a fourth plate that maintains the interval between the second link shaft and the center shaft.

The link mechanism may further include a third plate that maintains the intervals between the first hinge shaft, the second link shaft, and the center shaft, and a fourth plate that maintains the intervals between the second hinge shaft, the first link shaft, and the center shaft.

Advantageous Effect of the Invention

According to the present invention, it is possible to generate a click with sufficient strength at a predetermined rotation angle without causing a shaft to be protruded from an inner surface of a connecting portion of foldable housings. Therefore, the present invention increases an effective area of an inner surface of a foldable housing of an electronic device, and also allows various designs and the provision, to a user who opens/closes the housing, a click with sufficient strength at a predetermined rotation angle.

EMBODIMENTS OF THE INVENTION

Figure 1:
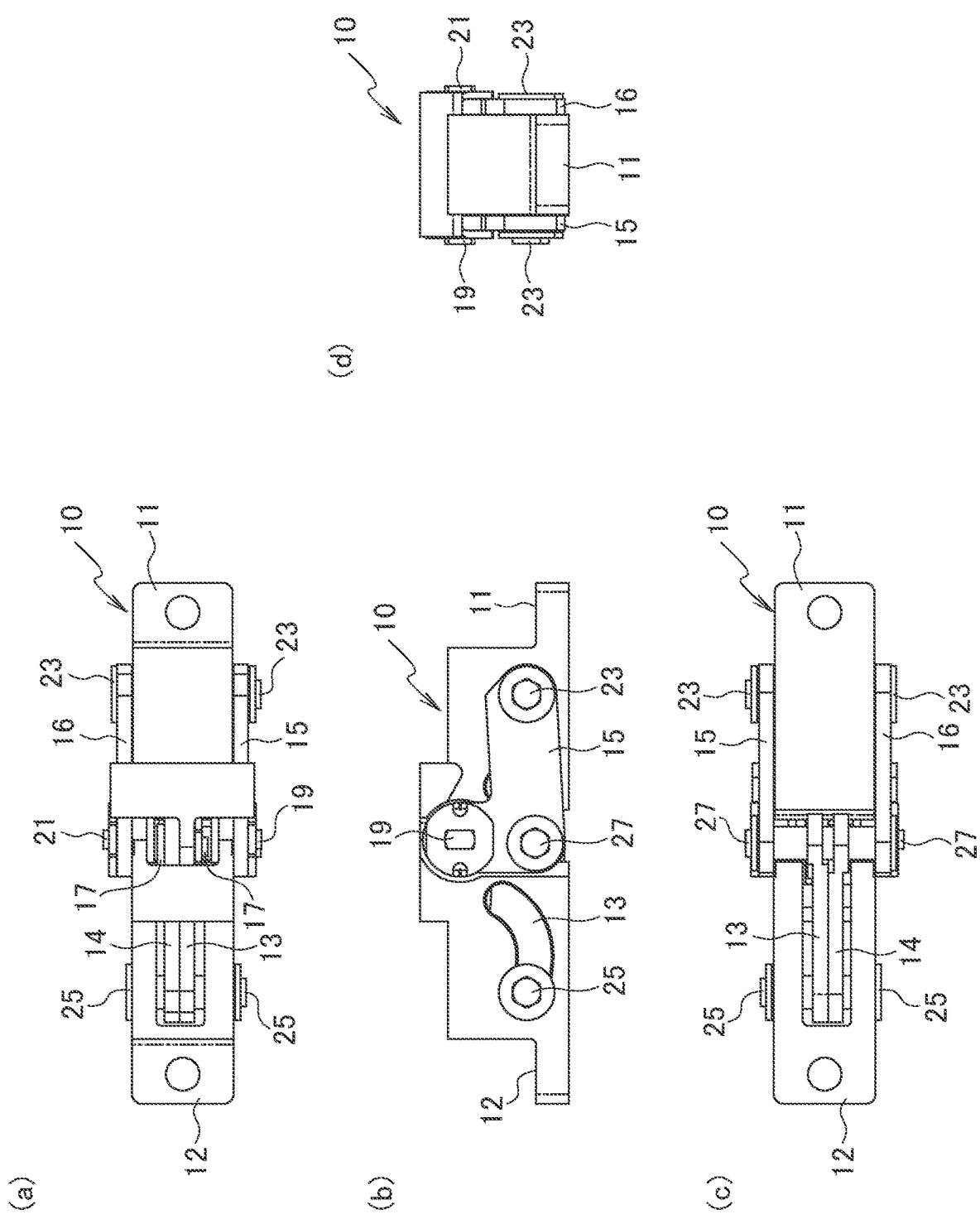
FIG. 1 is a four-view drawing of a hinge according to the present embodiment.
Figure 2:
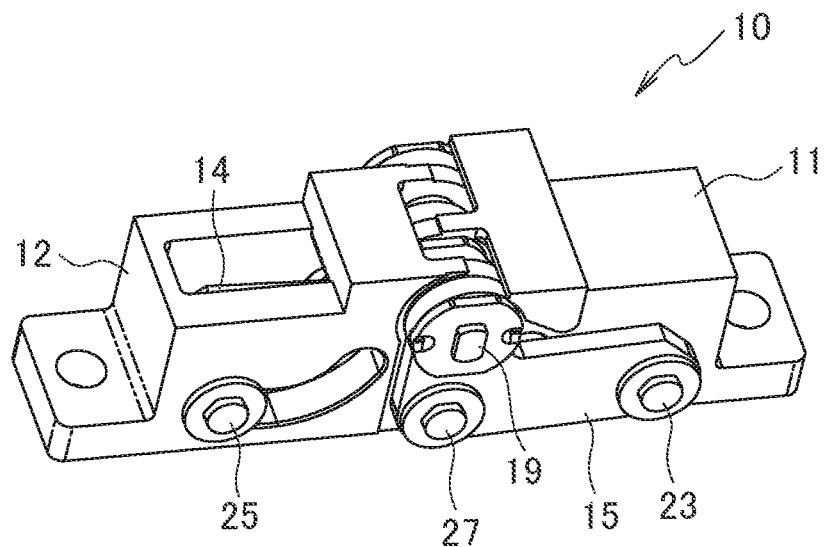
FIG. 2 is a perspective view of a hinge according to the present embodiment.
Figure 2:
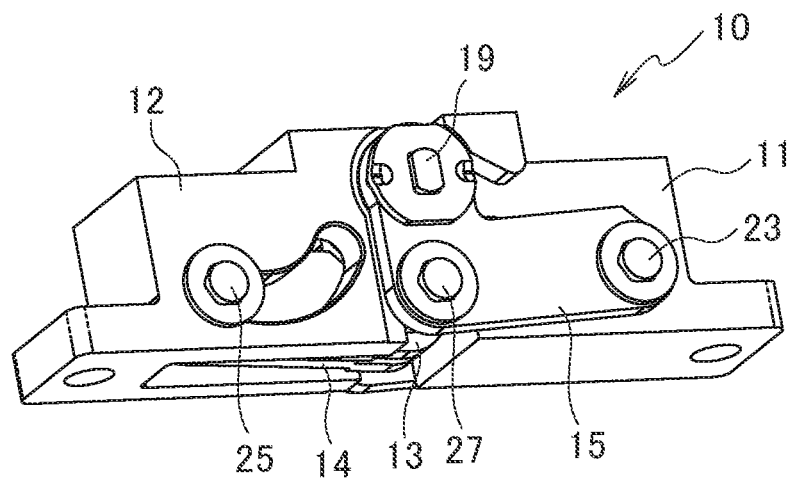

A hinge according to the present embodiment will be described in detail below with reference to the drawings. FIG. 1 is a four-view drawing of the hinge according to the present embodiment. FIG. 1(a) is a top view, FIG. 1(b) is a front view, FIG. 1(c) is a bottom view, and FIG. 1(d) is a right side view. FIG. 2 shows perspective views of the hinge according to the present embodiment. FIGS. 2(a) and 2(b) are perspective views as viewed from different directions.

As shown in FIGS. 1 and 2, a hinge 10 according to the present embodiment supports a first member and a second member (not shown) such that the first member and the second member are rotatable about a virtual rotation axis each other, and has a first case 11 attached with the first member and a second case 12 attached with the second member. The first case 11 has an insertion hole through which a first hinge shaft 17 parallel to the virtual rotation axis is inserted, and a guide groove for guiding a first link shaft 23 parallel to the virtual rotation axis. The second case 12 has a first insertion hole, a second insertion hole, and a guide groove, the first insertion hole and the second insertion hole being holes through which a second hinge shaft 19 and a third hinge shaft 21 that are parallel to the virtual rotation axis are inserted respectively, and the guide groove being a guide groove for guiding a second link shaft 25 parallel to the virtual rotation axis.

Further, the hinge 10 has a link mechanism that maintains intervals between the first hinge shaft 17, the second link shaft 25, and a center shaft 27 parallel to the virtual rotation axis, intervals between the second hinge shaft 19, the first link shaft 23, and the center shaft 27, and intervals between the third hinge shaft 21, the first link shaft 23, and the center shaft 27, and connects the first case 11 and the second case 12 such that the first case 11 and the second case 12 are rotatable about the virtual rotation axis. The first case 11, the second case 12, and the link mechanism are connected by the first hinge shaft 17, the second hinge shaft 19, the third hinge shaft 21, the first link shaft 23, the second link shaft 25, and the center shaft 27.

The link mechanism has a second center plate 14 that is a first plate for maintaining the intervals between the first hinge shaft 17, the second link shaft 25, and the center shaft 27, a first side plate 15 that is a second plate for maintaining the intervals between the second hinge shaft 19, the first link shaft 23, and the center shaft 27, and a second side plate 16 that is a third plate for maintaining the intervals between the third hinge shaft 21, the first link shaft 23, and the center shaft 27.

Figure 3:
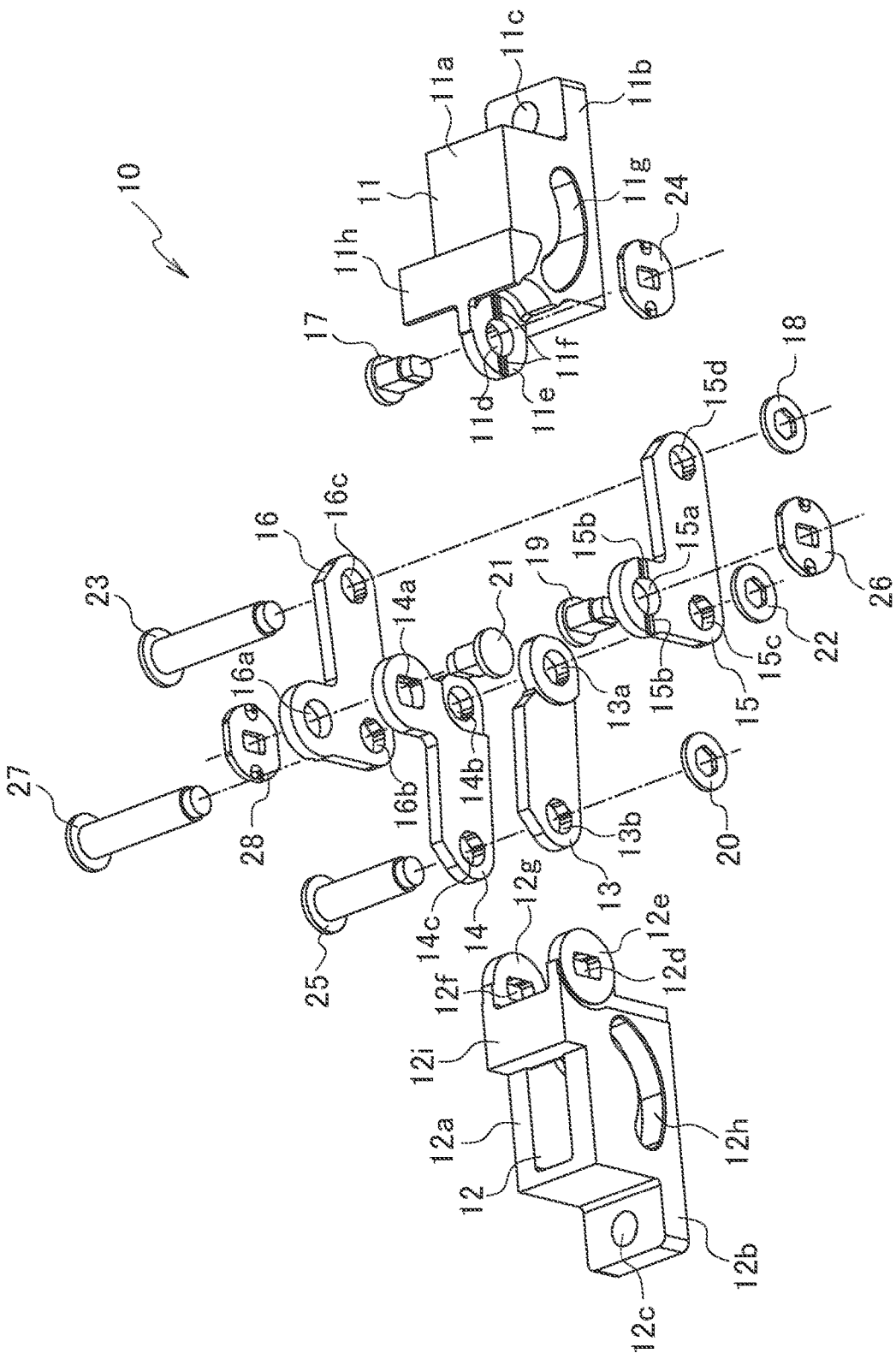
FIG. 3 is an exploded view of a hinge according to the present embodiment.

FIG. 3 is an exploded view of the hinge 10 according to the present embodiment. The first case 11 has a main body 11a with a substantially rectangular parallelepiped shape having four sides that are substantially parallel to the virtual rotation axis. From one of side surfaces of the main body 11a, a pedestal 11b of a predetermined thickness for attaching the first member is protruded over a predetermined length so as to extend a bottom surface of the main body 11a, and a screw hole 11c for attaching the first member is formed to the pedestal 11b. An ear 11e of a predetermined thickness is protruded from a portion near the substantially center of a top side of a side surface opposite to the side surface formed with the pedestal 11b of the main body 11a, the ear being formed with an insertion hole 11d through which the first hinge shaft 17 parallel to the virtual rotation axis is rotatably inserted, and a groove 11f extending in a radial direction across the insertion hole 11d is formed on a surface (a surface on a front side in the diagram) of the ear 11e around the insertion hole 11d.

On a pair of facing side surfaces not formed with the pedestal 11b or the ear 11e of the main body 11a, a guide groove 11g of a predetermined shape such as a curved shape or a straight shape is formed, the guide groove 11g being for guiding the first link shaft 23 parallel to the virtual rotation axis along a predetermined path in a plane (not shown) orthogonal to the virtual rotation axis. On a portion of a top side of the main body 11a, which portion is adjacent to the ear 11e, formed is a stopper 11h for limiting ranges of rotation angles of a first side plate 15 and a second side plate 16 described later which rotate about the first hinge shaft 17 inserted into the insertion hole 11d formed to the ear 11e. The first case 11 with such a structure may be made by the metal powder injection molding or die casting by using stainless steel or iron as materials.

The second case 12 of a substantially rectangular parallelepiped shape having four sides that are substantially parallel to the virtual rotation axis, includes a main body 12a having a predetermined cavity formed inside. From one of side surfaces of the main body 12*a*, a pedestal 12*b* of a predetermined thickness for attaching the second member is protruded over a predetermined length so as to extend a bottom surface of the main body 12*a*, and a screw hole 12*c* for attaching the second member is formed to the pedestal 12*b*. From portions near one end and the other end of the top side of a side surface opposite to the side surface formed with the pedestal 12*b* of the main body 12*a*, a first ear 12*e* and a second ear 12*g* of a predetermined thickness are respectively protruded, the first ear 12*e* and the second ear 12*g* being formed with a first insertion hole 12*d* and a second insertion hole 12*f* through which the second hinge shaft 19 and the third hinge shaft 21 that are coaxial and parallel to the virtual rotation axis are inserted. The first insertion hole 12*d* and the second insertion hole 12*f* are shaped to be engaged with the two-side chamfered second hinge shaft 19 and third hinge shaft 21, and the second hinge shaft 19 and the third hinge shaft 21 are restrained to rotate together with the second case 12.

On a pair of facing side surfaces not formed with the pedestal 12*b* or the first ear 12*e* and the second ear 12*g* of the main body 12*a*, guide grooves 12*h* of a predetermined shape such as a curved shape or a straight shape are formed, the guide grooves 12*h* being for guiding the second link shaft 25 parallel to the virtual rotation axis along a predetermined path in a plane (not shown) orthogonal to the virtual rotation axis. A shape of the guide groove 12*h* is symmetrical with a shape of the guide groove 11*g* of the first case 11 in a plane passing through the virtual rotation axis and an axis of the center shaft 27.

A stopper 12*i* is formed to a portion of the top side of the main body 12*a*, which portion is adjacent to the first ear 12*e* and the second ear 12*g*, the stopper 12*i* being for limiting ranges of rotation angles of a first center plate 13 and a second center plate 14 described later that rotate about the second hinge shaft 19 and the third hinge shaft 21 that are respectively inserted into the first insertion hole 12*d* and the second insertion hole 12*f* formed to the first ear 12*e* and the second ear 12*g* respectively. As in the first case 11, the second case 12 with such a structure may be made by the metal powder injection molding or die casting by using stainless steel or iron as a material.

The first center plate 13 of a predetermined thickness has a shape extending in one direction and, at a portion near one end of the first center plate 13, the first insertion hole 13*a* through which the center shaft 27 parallel to the virtual rotation axis is rotatably inserted is formed, and at a portion near the other end of the first center plate 13, the second insertion hole 13*b* through which the second link shaft 25 is rotatably inserted is formed so that a predetermined interval is maintained between the center shaft 27 inserted into the first insertion hole 13*a* and the second link shaft 25 inserted into the second insertion hole 13*b*. The first center plate 13 may be made by applying the press working to stainless steel or iron.

The second center plate 14 of a predetermined thickness has a shape extending in two directions, and at a portion near an end of a short side of the second center plate 14, the first insertion hole 14*a* through which the first hinge shaft 17 is inserted is formed, at a portion near an apex at which a short side and a long side intersect each other, of the second center plate 14, the second insertion hole 14*b* through which the center shaft 27 is rotatably inserted is formed, and at a portion near an end of the long side of the second center plate 14, a third insertion hole 14*c* through which the second link shaft 25 is rotatably inserted is formed. The first insertion hole 14*a* has a shape to be engaged with the two-side chamfered first hinge shaft 17, and restrains the first hinge shaft 17 so that the first hinge shaft 17 rotates together with the second center plate 14. The second center plate 14 maintains each of intervals between the first hinge shaft 17 inserted into the first insertion hole 14*a*, the center shaft 27 inserted into the second insertion hole 14*b*, and the second link shaft 25 inserted into the third insertion hole 14*c* to be a predetermined interval. As in the first center plate 13, the second center plate 14 may be made by applying the press working to stainless steel or iron.

The first side plate 15 of a predetermined thickness has a shape extending in two directions, and at a portion near an end of a short side of the first side plate 15, a first insertion hole 15*a* through which the second hinge shaft 19 is rotatably inserted is formed, at a portion near an apex at which the short side and a long side intersect each other of the first side plate 15, a second insertion hole 15*c* through which the center shaft 27 is rotatably inserted is formed, and at a portion near an end of the long side of the first side plate 15, a third insertion hole 15*d* through which the first link shaft 23 is rotatably inserted is formed. A groove 15*b* extending in a radial direction across the first insertion hole 15*a* is formed on a surface (a surface on a front side in the diagram) around the first insertion hole 15*a*. The first side plate 15 maintains intervals between the second hinge shaft 19 inserted into the first insertion hole 15*a*, the center shaft 27 inserted into the second insertion hole 15*c*, and the first link shaft 23 inserted into the third insertion hole 15*d* to be a predetermined interval. The first side plate 15 may be made by applying the press working to stainless steel or iron.

The second side plate 16 of a predetermined thickness has a shape extending in two directions, and at a portion near an end of a short side of the second side plate 16, a first insertion hole 16*a* through which the third hinge shaft 21 is rotatably inserted is formed, at a portion near an apex at which the short side and a long side intersect each other, of the second side plate 16, a second insertion hole 16*b* through which the center shaft 27 is rotatably inserted is formed, and at a portion near an end of the long side of the second side plate 16, a third insertion hole 16*c* through which the first link shaft 23 is rotatably inserted is formed. A groove (not shown) extending in a radial direction across the first insertion hole 16*a* is formed on a surface (a surface on a back side in the diagram) around the first insertion hole 16*a*. The second side plate 16 maintains each of intervals between the third hinge shaft 21 inserted into the first insertion hole 16*a*, the center shaft 27 inserted into the second insertion hole 16*b*, and the first link shaft 23 inserted into the third insertion hole 16*c* to be a predetermined interval. As in the first side plate 15, the second side plate 16 may be made by applying the press working to stainless steel or iron.

The first hinge shaft 17 with a predetermined diameter is subjected to the two-side chamfering, is inserted into the first insertion hole 14*a* of the second center plate 14 and then into the insertion hole 11*d* of the first case 11 in the order from a back side to a front side of the diagram, and has, at an end thereof, a first click plate 24 which is attached by performing the caulking processing to the end. In the following description, if it is not especially noted, it is assumed that individual shafts are inserted in the order from a back side to a front side of each diagram. The two-side chamfered first hinge shaft 17 is restrained such that the first hinge shaft 17 rotates together with the second center plate 14 engaged at the first insertion hole 14*a* and the first click plate 24 subjected to the caulking processing. On the other hand, the first hinge shaft 17 is rotatably inserted into the insertion hole 11*d* of the first case 11. The first hinge shaft 17 may be made by applying the cutting machining or header processing to stainless steel or iron. The first click plate 24 may be made by applying the press working to stainless steel or iron.

The second hinge shaft 19 with a predetermined diameter is subjected to the two-side chamfering, is inserted through the first insertion hole 12d of the second case 12 and then into the first insertion hole 15a of the first side plate 15 in this order, and has, at one end thereof, a second click plate 26 which is attached by performing the caulking processing to the end. The two-side chamfered second hinge shaft 19 is restrained such that the second hinge shaft 19 rotates together with the second case 12 engaged at the first insertion hole 12d and the second click plate 26 subjected to the caulking processing. On the other hand, the second hinge shaft 19 is rotatably inserted into the first insertion hole 15a of the first side plate 15. As in the first hinge shaft 17, the second hinge shaft 19 may be made by applying the cutting machining or header processing to stainless steel or iron. As in the first click plate 24, the second click plate 26 may be made by applying the press working to stainless steel or iron.

The third hinge shaft 21 with a predetermined diameter is subjected to the two-side chamfering, is inserted through the second insertion hole 12f of the second case 12 and the first insertion hole 16a of the second side plate 16 in the order from a front side to a back side of the diagram, and has, at one end thereof, a third click plate 28 which is attached by performing the caulking processing to the end. The two-side chamfered third hinge shaft 21 is restrained such that the third hinge shaft 21 rotates together with the second case 12 engaged at the second insertion hole 12f and the third click plate 28 subjected to the caulking processing. On the other hand, the second hinge shaft 19 is rotatably inserted into the first insertion hole 16a of the second side plate 16. As in the first hinge shaft 17 and the second hinge shaft 19, the third hinge shaft 21 may be made by applying the cutting machining or header processing to stainless steel or iron. As in the first click plate 24 and the second click plate 26, the third click plate 28 may be made by performing the press working to stainless steel or iron.

The first link shaft 23 with a predetermined diameter is inserted through a third insertion hole 16c of the second side plate 16, and then though a pair of guide grooves 11g formed on side surfaces of the first case 11, and a third insertion hole 15d of the first side plate 15 in this order, and has, at an end thereof, a first rivet plate 18 which is attached by performing the caulking processing to the end. The first link shaft 23 may extend through the inside of the first case 11 and may move along the guide groove 11g of the first case 11. The first link shaft 23 may be made by applying the cutting machining or header processing to stainless steel or iron. The first rivet plate 18 may be made by applying the press working to stainless steel or iron.

The second link shaft 25 with a predetermined diameter is inserted through the guide groove 12h on the back side of the diagram from between a pair of guide grooves 12h formed on the side surfaces of the second case 12, and then through a third insertion hole 14c of the second center plate 14, a second insertion hole 13b of the first center plate 13, and a guide groove 12h on the front side of the diagram from between a pair of guide grooves 12h of the second case 12 in this order, and has, at an end thereof, a second rivet plate 20 which is attached by performing the caulking processing to the end. The second link shaft 25 may extend through a cavity inside the second case 12 and may move along a pair of guide grooves 12h of the second case 12. The first center plate 13 and the second center plate 14 also extend into the cavity inside the second case 12. As in the first link shaft 23, the second link shaft 25 may be made by applying the cutting machining or header processing to stainless steel or iron. As in the first rivet plate 18, the second rivet plate 20 may be made by applying the press working to stainless steel or iron.

The center shaft 27 with a predetermined diameter is inserted through the second insertion hole 16b of the second side plate 16, and then through the second insertion hole 14b of the second center plate 14, the first insertion hole 13a of the first center plate 13, and the second insertion hole 15c of the first side plate 15 in this order, and has, at an end thereof, a third rivet plate 22 which is attached by performing the caulking processing to the end. The center shaft 27 may be made by applying the cutting machining or header processing to stainless steel or iron. As in the first rivet plate 18 and the second rivet plate 20, the third rivet plate 22 may be made by applying the press working to stainless steel or iron.

Figure 4:
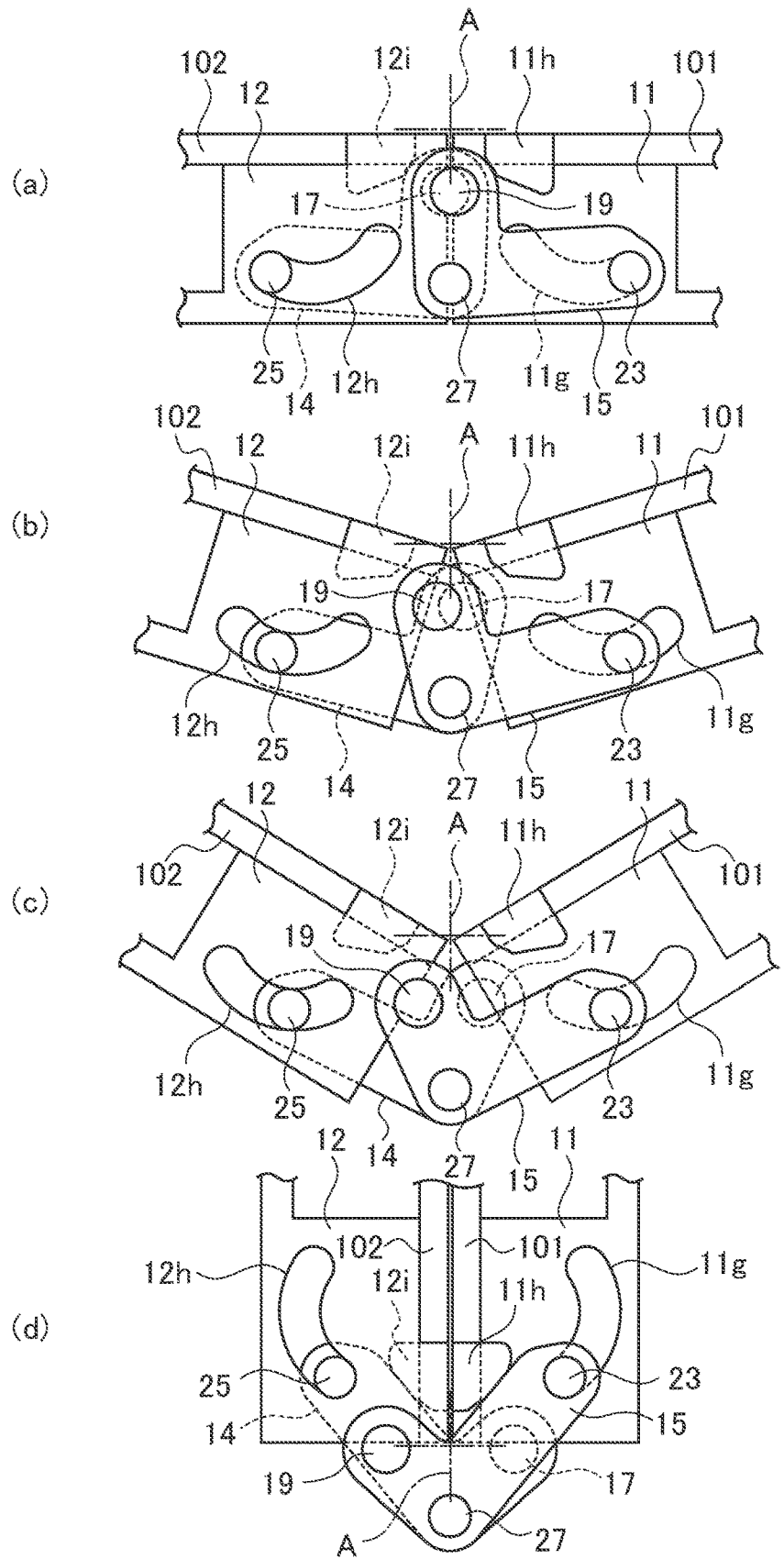
FIG. 4 is a main part front view showing movement of a link mechanism of a hinge according to the present embodiment.

FIG. 4 is a main part front view showing movement of a link mechanism of the hinge 10 according to the present embodiment. The hinge 10 according to the present embodiment is configured such that the first case 11 attached with the first member and the second case 12 attached with the second member are connected by the link mechanism so as to be rotatable about a virtual rotation axis A. In FIG. 4, a plate-shaped first member 101 of a predetermined thickness is attached to a top surface of the first case 11, and a second member 102 having the same thickness as that of the first member 101 is also attached to a top surface of the second case 12. The first member 101 and the second member extend beyond a stopper 11h of the first case 11 and a stopper 12i of the second case 12 respectively toward the virtual rotation axis A, and ends of the top surfaces of the individual first and second members face each other across the center rotary shaft A. An open/close state of the hinge 10 is set to be in accordance with an open/close state of the plate-shaped first member 101 and second member 102.

FIG. 4(a) shows a state in which the hinge 10 is fully opened. In this state, the top surfaces or the bottom surfaces of the first case 11 and the second case 12 form the same plane. The first member 101 and the second member 102 are also in a completely opened state, and the top surfaces of the first member 101 and the second member 102 also form the same plane. The first link shaft 23 guided by the guide groove 11g of the first case 11 is positioned at one end of the guide groove 11g that is farthest from the first hinge shaft 17. The second link shaft 25 guided by the guide groove 12h of the second case 12 is also positioned at one end of the guide groove 12h that is farthest from the second hinge shaft 19.

FIG. 4(b) shows the hinge 10 in a slightly closed state which is changed from the hinge 10 in the fully opened state shown in FIG. 4(a). In this state, each of the top surfaces and the bottom surface of the first case 11 and the second case 12 are in a slightly closed sate. The first member 101 and the second member 102 are also in a slightly closed state. The first link shaft 23 guided by the guide groove 11g of the first case 11 is positioned at a place which is slightly advanced from one end of the guide groove 11g farthest from the first hinge shaft 17 toward the other end of the guide groove 11g closest to the first hinge shaft 17. The second link shaft 25 guided by the guide groove 12h of the second case 12 is also positioned at a place which is slightly advanced from one end of the guide groove 12h farthest from the second hinge shaft 19 to the other end of the guide groove 12h closest to the second hinge shaft 19.

FIG. 4(c) shows the hinge 10 in a further closed state which is changed from the hinge 10 in the slightly closed state shown in FIG. 4(b). In this state, each of the top surfaces and the bottom surfaces of the first case 11 and the second case 12 are in a further closed state. The first member 101 and the second member 102 are also in a further closed state. The first link shaft 23 guided by the guide groove 11g of the first case 11 is positioned at a place which is further advanced from one end of the guide groove 11g farthest from the first hinge shaft 17 toward the other end of the guide groove 11g closest to the first hinge shaft 17. The second link shaft 25 guided by the guide groove 12h of the second case 12 is also positioned at a place which is further advanced from one end of the guide groove 12h farthest from the second hinge shaft 19 toward the other end of the guide groove 12h closest to the second hinge shaft 19.

FIG. 4(d) shows a state in which the hinge 10 is completely closed. In this state, each of the top surfaces and the bottom surfaces of the first case 11 and the second case 12 face each other and are parallel to each other. The first member 101 and the second member 102 are also in a completely closed state. The first link shaft 23 guided by the guide groove 11g of the first case 11 is positioned at the other end of the guide groove 11g closest to the first hinge shaft 17. The second link shaft 25 guided by the guide groove 12h of the second case 12 is also positioned at the other end of the guide groove 12h closest to the second hinge shaft 19. A long side of the second center plate 14 abuts a stopper 12i of the second case 12, and long sides of the first side plate 15 and a second side plate 16 (not shown) abut a stopper 11h of the first case 11, and both stoppers prevent the rotation in a direction in which the hinge 10 is closed.

During the opening/closing movement of the hinge 10 shown in FIGS. 4(a) to 4(d), the first case 11 and the second case 12 are rotatable about the virtual rotation axis A that is positioned approximately at the center between the end of the top surface of the first member 101 attached to the first case 11 and the end of the top surface of the second member 102 attached to the second case 12. An interval between the end of the top surface of the first member 101 and the end of the top surface of the second member 102, the ends facing each other across the virtual rotation axis A, is substantially constant. Such the rotation about the virtual rotation axis A is performed by the link mechanism including the second center plate 14, the first side plate 15, and the second side plate 16, which connect the first case 11 and the second case 12.

In the link mechanism of the present embodiment, an axis of the first hinge shaft 17, axes of the second hinge shaft 19 and the third hinge shaft 21, an axis of the first link shaft 23, an axis of the second link shaft 25, and an axis of the center shaft 27 have a reflectional symmetry structure in a plane passing through the virtual rotation axis A and an axis of the center shaft 27. The guide groove 11g of the first case 11 and the guide groove 12h of the second case 12 are also symmetrical in the plane. Therefore, in all states of the opening/closing movement of the hinge 10 in FIGS. 4(a) to 4(d), the main axes of the link mechanism are symmetrical in the plane, and the first case 11 and the second case 12 supported by the link mechanism are also symmetrical in the plane, because the first case 11 and the second case 12 are synchronized to form the same angle with the plane for opening/closing the hinge.

The guide groove 11g of the first case 11 and the guide groove 12h of the second case 12 define paths along which the first link shaft 23 and the second link shaft 25 are respectively guided in a plane orthogonal to the virtual rotation axis A, when the hinge 10 is opened/closed. Therefore, to the shapes of the guide groove 11g and the guide groove 12h, it is possible to set how the interval between the end of the top surface of the first member 101 and the end of the top surface of the second member 102 that face across the virtual rotation axis A is changed relative to the opening/closing angle of the hinge 10. In the present embodiment, the guide groove 11g and the guide groove 12h are formed into an appropriate shape such that the interval is substantially constant irrespective of the opening/closing movement of the hinge 10. Note that, the settable interval is not limited to this, and it is also possible to set how the interval between the first case 11 and the second case 12 that face each other across the virtual rotation axis A is changed relative to the opening/closing angle of the hinge 10.

In the hinge 10 according to the present embodiment, the rotations of the first case 11 and the second case 12 about the virtual rotation axis A are realized by the link mechanism including the first center plate 13, the second center plate 14, the first side plate 15, and the second side plate 16. Therefore, the hinge 10 according to the present embodiment is robust, has the durability to withstand a large number of opening/closing movement, and can stably operate for a long period of time.

Figure 5:
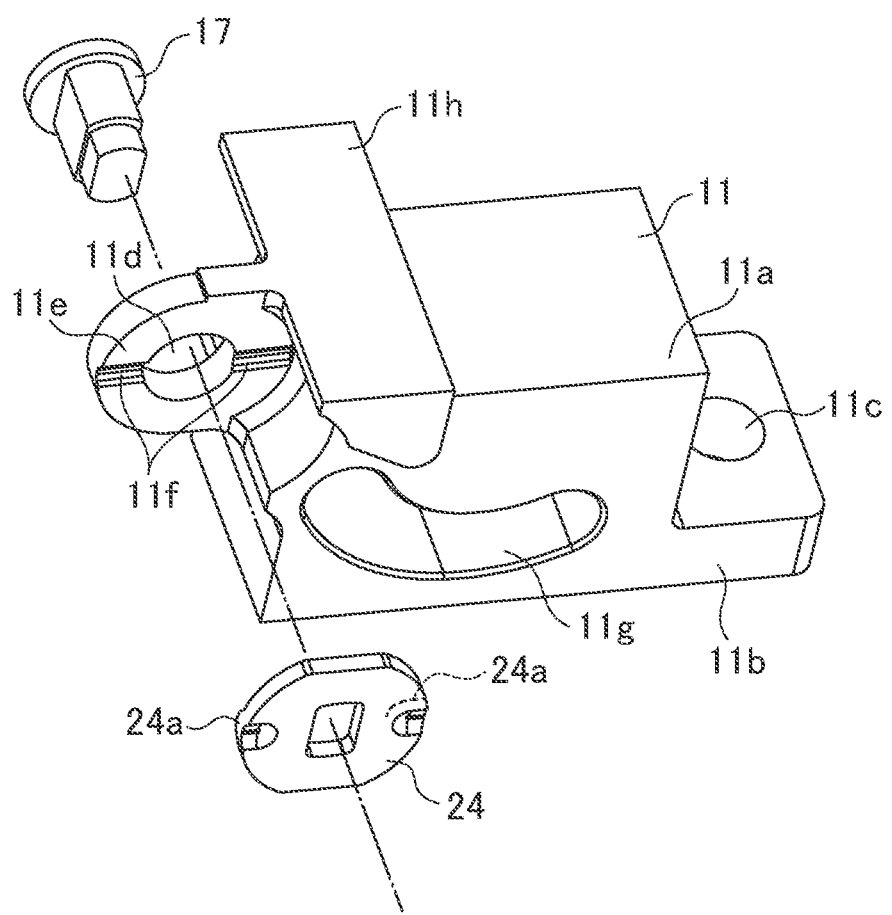
FIG. 5 is a diagram for explaining a torque generating mechanism of a hinge according to the present embodiment.

FIG. 5 is a diagram for explaining a torque generating mechanism of the hinge 10 according to the present embodiment. FIG. 5 shows a configuration of a first torque generating mechanism including the first case 11 having the ear 11e formed with the insertion hole 11d, the first hinge shaft 17 inserted into the insertion hole 11d, and the first click plate 24 which is attached to the end of the first hinge shaft 17 inserted into the insertion hole 11d by performing the caulking processing to the end. The first hinge shaft 17 with a predetermined diameter is subjected to the two-side chamfering, and is inserted into a first insertion hole 14a of the second center plate 14 (not shown), the insertion hole 11d of the first case 11, and the first click plate 24 in order from a back side to a front side of the diagram. The two-side chamfered first hinge shaft 17 is restrained such that the first hinge shaft 17 rotates together with the second center plate 14 engaged at the first insertion hole 14a and the first click plate 24 which is attached by performing the caulking processing. In the first torque generating mechanism, a surface of the ear 11e formed with groove 11f and a surface of the first click plate 17 formed with a pair of convex portions 24a across the first hinge shaft 17 face and contact each other, the first click plate 24 presses the surface of the ear 11e as energizing means of a leaf spring, and slides and rotates on the surface of the ear 11e according to the rotation of the first hinge shaft 11 to generate the torque for the rotation of the first hinge shaft 17.

Figure 6:
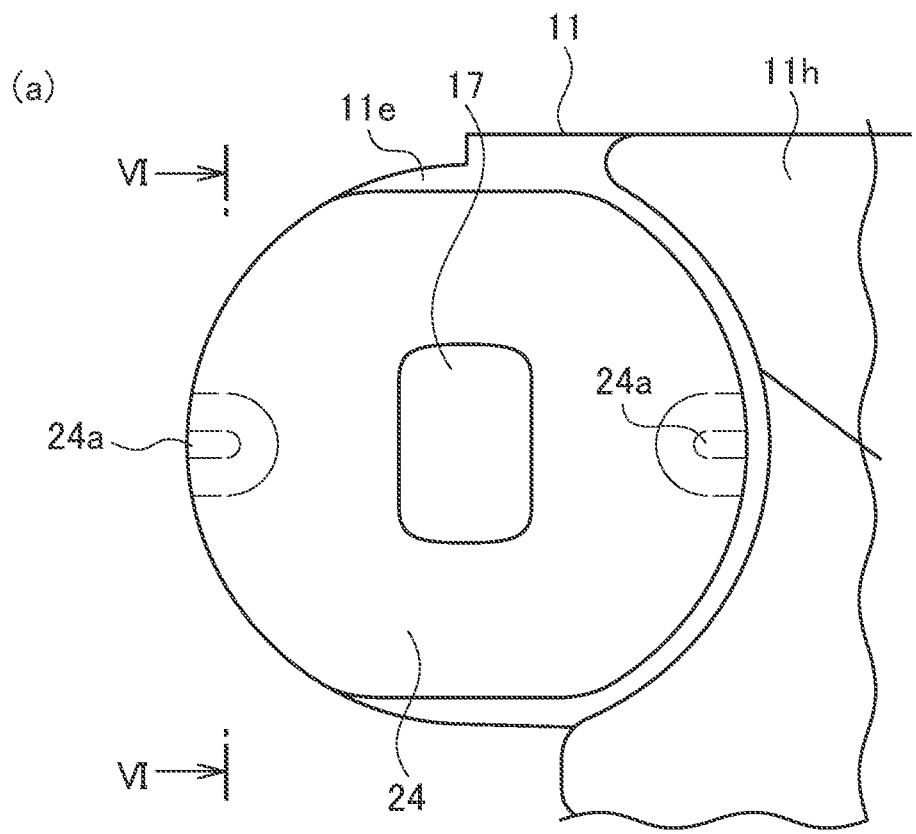
FIG. 6 is a diagram for explaining the generation of the torque.
Figure 6:
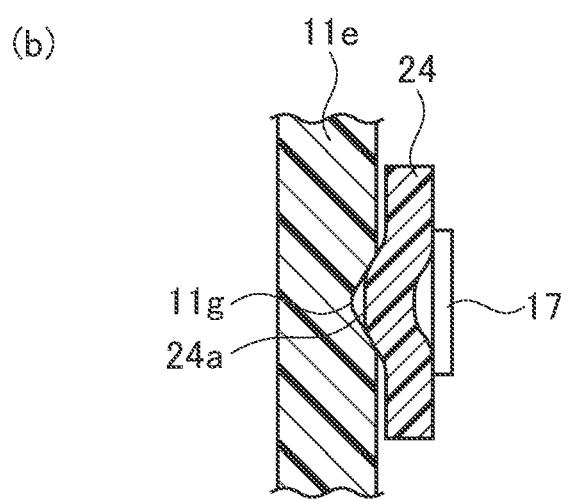

FIG. 6 is a diagram for explaining the generation of the torque. FIG. 6(a) shows a main part of the first torque generating mechanism shown in FIG. 5. A surface of the first click plate 24 on which the convex portions 24a are formed faces and contacts the surface of the ear 11e of the first case 11. The first click plate 24 is engaged with the two-side chamfered first hinge shaft 17 and rotated according to the first hinge shaft 17. FIG. 6(b) is a sectional view taken along a cross section VI-VI of FIG. 6. FIG. 6(b) shows that the convex portions 24a of the first click plate 24 are fitted into the V-shaped grooves 11f that are formed on the surface of the ear 11e of the first case 11 and radially extend from the insertion hole 11d.

Figure 7:
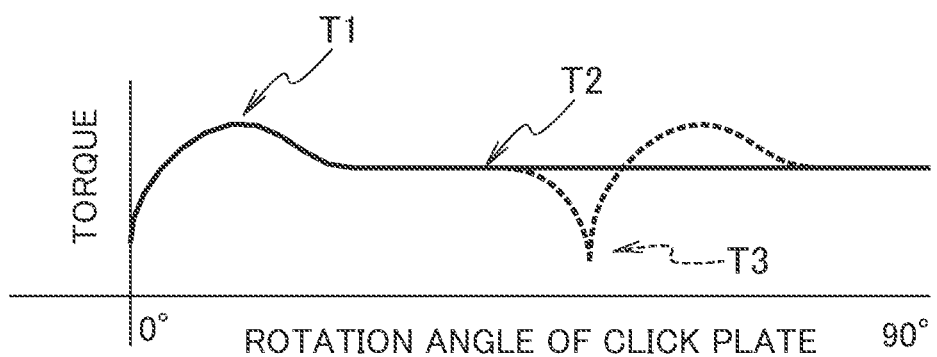
FIG. 7 is a graph showing the relationship between a rotation angle of a first case and the torque.

FIG. 7 is a graph showing the relationship between the rotation angle of the first case 11 and the torque. As shown in FIG. 6, the graph of FIG. 7 shows a state where the convex portions 24a of the first click plate 24 are fitted in the grooves 11f on the surface of the ear 11e of the first case 11, as 0 degree of the rotation angle of the first case 11, and shows the change in the torque generated by the first torque generating mechanism in accordance with the increase in the rotation angle of the first case 11. The 0 degree of the rotation angle of the first case 11 corresponds to a state where the first case 11 and the second case 12 of the hinge 10 are completely opened.

As shown in FIG. 7, the maximum torque T1 is generated when the convex portions 24a of the first click plate 24 fitted into the grooves 11f on the surface of the ear 11e in accordance with the rotation of the first case 11 escape from the grooves 11f. This enables the provision of the energizing force for maintaining the completely opened state of the first case 11. Thereafter, according to the rotation of the first case 11, the first click plate 24 slides on the surface of the ear 11e, and accordingly, a substantially constant torque T2 is maintained.

Forming another groove that extends in a predetermined direction across the insertion hole 11d on the surface of the ear 11e can generate a click at a predetermined rotation angle. If the first case 11 is rotated such that an angle exceeds the rotation angle, the approximately constant torque T2 is reduced down to the minimum torque T3 when the convex portions 24a of the first click plate 24 fall into another groove, and alternatively the torque increases back to the approximately constant torque T2 when the convex portions 24a are escaped from another groove. Therefore, a click is provided in which the sinking and the resistance can be felt successively in the rotating movement of the first case 11. The hinge 10 according to the present embodiment is configured such that the first click plate 24 can provide the strong elastic force by the leaf spring in the axial direction of the first hinge shaft 17, and thus, a click with sufficient strength can be provided.

The hinge 10 according to the present embodiment includes a second torque generating mechanism constituted of the second hinge shaft 19, the first side plate 15, and the second click plate 26, and a third torque generating mechanism constituted of the third hinge shaft 21, the second side plate 16, and the third click plate 28, in addition to the first torque generating mechanism. As in the first torque generating mechanism, the second torque generating mechanism and the third torque generating mechanism generate the torque for the rotation of the second case 12. For the second case 12 also, the second click plate 26 and the third click plate 28 can provide the strong elastic force by the leaf spring in the axial direction of the second hinge shaft 19 and the third hinge shaft 21 respectively, and therefore, a click with sufficient strength can be provided.

In the hinge 10 according to the present embodiment, the first to third torque generating mechanisms cause the maximum torque to be generated when the first case 11 and the second case 12 start rotating from a completely opened state or alternatively from a completely closed state, and accordingly, the energizing force can be imparted. Further, if the first case 11 and the second case 12 are rotated such that an angle exceeds a specific rotation angle, a click can be provided in which the torque is decreased and then increased.

Figure 8:
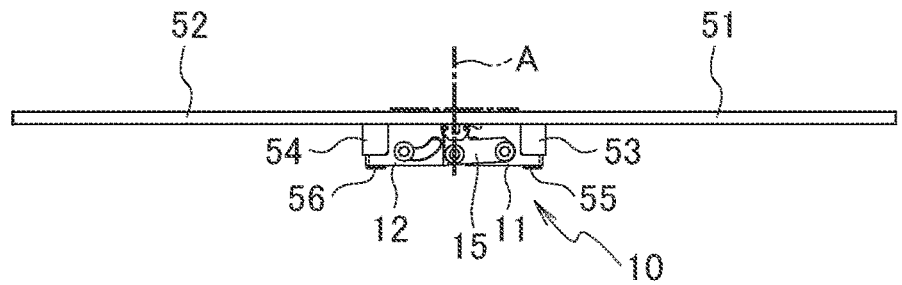
FIG. 8 is a side view showing movement of a hinge according to the present embodiment.
Figure 8:
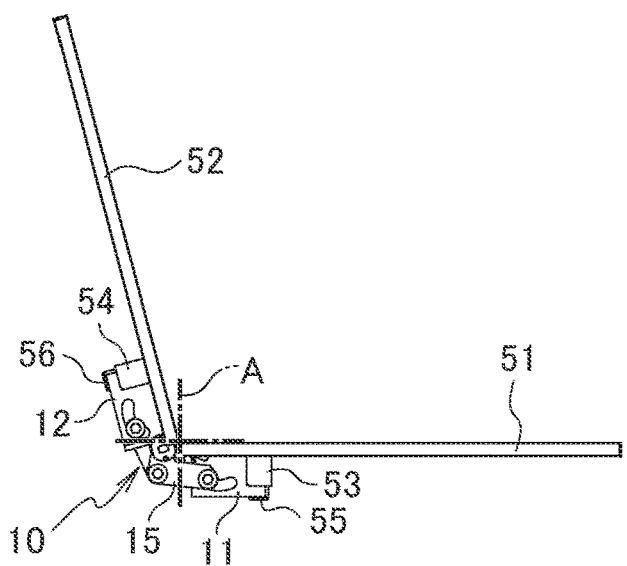
Figure 8:
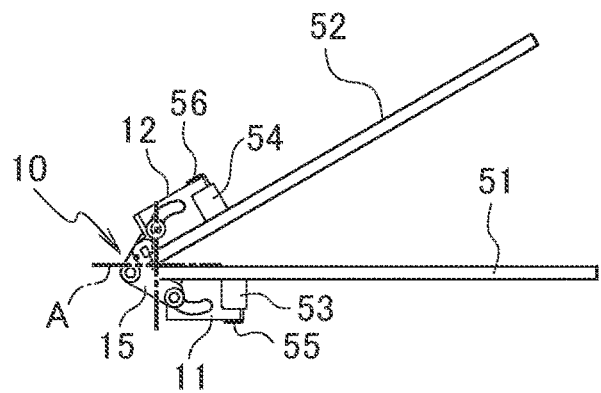
Figure 9:
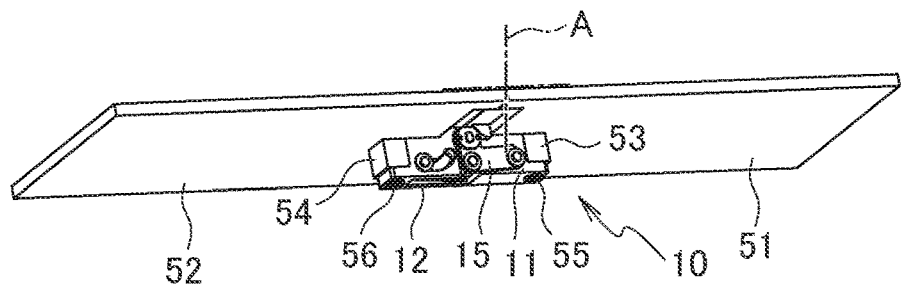
FIG. 9 is a perspective view showing movement of a hinge according to the present embodiment.
Figure 9:
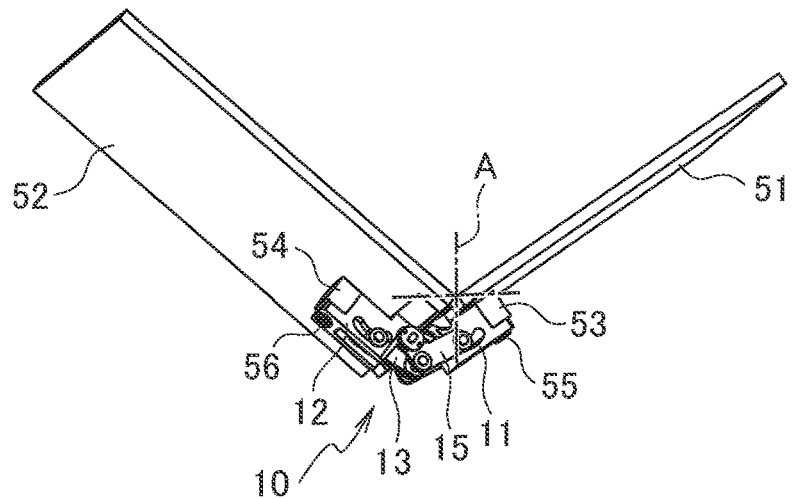
Figure 9:
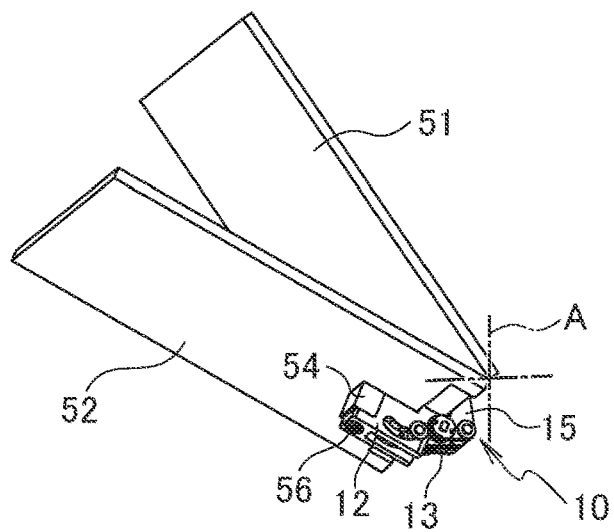

FIG. 8 is a side view for explaining movement of the hinge 10 according to the present embodiment. FIG. 9 is a perspective view for explaining movement of the hinge 10 according to the present embodiment. In FIGS. 8 and 9, the hinge 10 according to the present embodiment connects the plate-shaped first member 51 and second member 52, each having a predetermined gap between facing end surfaces thereof, such that the first member 51 and second member 52 are rotatably supported each other. On the bottom surface of the first member 51, the first case 11 of the hinge 10 is attached by using a screw 55 passing through a screw hole 11c of the pedestal 11b via a spacer 53, and on the bottom surface of the second member 52, the second case 12 is attached by using a screw 56 passing through the screw hole 12c of the pedestal 12b via a spacer 54. In order to accommodate each of the stopper 11h which is higher than the main body 11a of the first case 11 and the stopper 12i which is higher than the main body 12a of the second case 12, a recess of a predetermined depth is formed in a predetermined range from the facing end surfaces of each of the first member 51 and the second member 52.

FIGS. 8(a) and 9(a) show a state in which a top surface of the first member 51 attached to the first case 11 and a top surface of the second member 52 attached to the second case 12 are substantially on the same plane, and thus, the first case 11 and the second case 12 of the hinge 10 are completely opened. FIGS. 8(b) and 9(b) show a state in which the top surface of the first member 51 attached to the first case 11 and the top surface of the second member 52 attached to the second case 12 are closed by forming an angle close to a right angle therebetween, and thus, the first case 11 and the second case 12 of the hinge 10 are closed by forming an angle close to the right angle therebetween. FIGS. 8(c) and 9(c) show a state in which both the top surface of the first member 51 attached to the first case 11 and the top surface of the second member 52 attached to the second case 12 are closed by forming an angle less than the right angle therebetween, and thus, the first case 11 and the second case 12 of the hinge 10 are closed by forming an angle less than the right angle. In all of these states, an interval between facing ends of the top surface of the first member 51 and the top surface of the second member 52 is constant. The hinge 10 realizes the rotation of the first member 51 and the second member 52 about the center of the facing ends of the top surface of the first member 51 and the top surface of the second member 52 as the virtual rotation axis A.

The hinge 10 according to the present embodiment supports the first member 51 and the second member 52 so that the first member 51 and the second member 52 can rotate about the center of the facing ends of the top surface of the first member 51 and the top surface of the second member 52 as the virtual rotation axis A, and the shaft of the rotary shaft does not protrude from the top surface of the first member 51 or the top surface of the second member 52. Therefore, the hinge 10 according to the present embodiment can ensure and effectively use effective areas of the top surface of the first member 51 and the top surface of the second member 52, and various designs are possible. Further, the hinge 10 according to the present embodiment can provide a click with sufficient strength at a predetermined rotation angle of the first member 51 and the second member 52, and provide a convenience when the first member 51 and the second member 52 are rotated. Furthermore, the hinge 10 according to the present embodiment has the durability to withstand a large number of opening/closing movement, and can stably operate over a long period of time.

Figure 10:
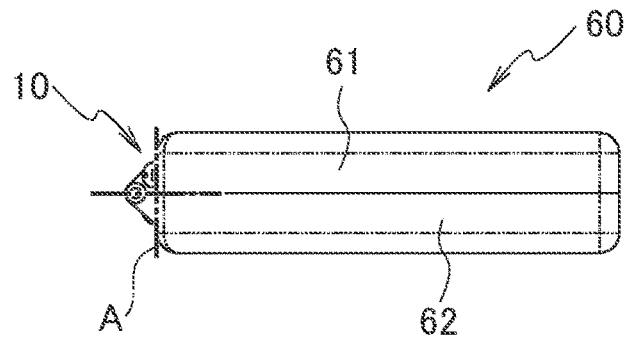
FIG. 10 shows an electronic device applied with a hinge according to the present embodiment.
Figure 10:
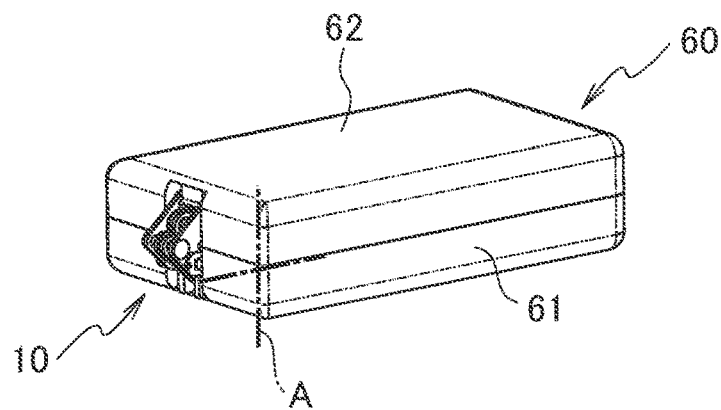
Figure 10:
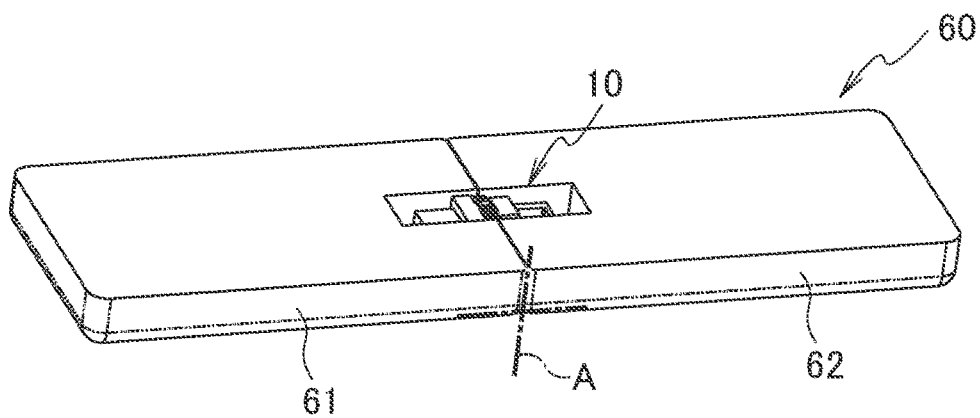

FIG. 10 is a diagram showing an electronic device 60 applied with the hinge 10 according to the present embodiment. In the electronic device 60, rectangular parallelepiped-shaped first housing 61 and second housing 62 that are slightly flat and have similar dimensions are rotatably connected each other in a foldable manner by the hinge 10. The electronic device 60 may be a mobile phone, a notebook computer or the like, and a display such as an LCD is provided on an inner surface of either one of the first housing 61 and the second housing 62, and a manipulation means such as a push button or a keyboard is provided on an inner surface of the other of the housings. FIGS. 10(a) and 10(b) are a front view and a perspective view of the electronic device 60 in a completely closed state respectively, and FIG. 10(c) is a perspective view of the electronic device 60 in a completely open state.

By using the hinge 10 according to the present embodiment, the first housing 61 and the second housing 62 are rotated about the center of the ends of the inner surfaces of the first housing 61 and the second housing 62 as the virtual rotation axis A, such that an interval between the ends of the inner surfaces of the first housing 61 and the second housing 62 is kept to be constant. In the hinge 10 according to the present embodiment, the shaft of the rotary shaft does not protrude from the inner surface in a state where the first housing 61 and the second housing 62 are completely opened. Therefore, the effective areas of the inner surfaces of the first housing 61 and the second housing 62 can be ensured, and various designs are possible. Further, the hinge 10 according to the present embodiment can provide a click with sufficient strength at predetermined rotation angles of the first housing 61 and the second housing 62, and provide the convenience when the first housing 61 and the second housing 62 are rotated. Furthermore, the hinge 10 according to the present embodiment has the durability to withstand a large number of opening/closing movement, and can stably operate over a long period of time.

Figure 11:
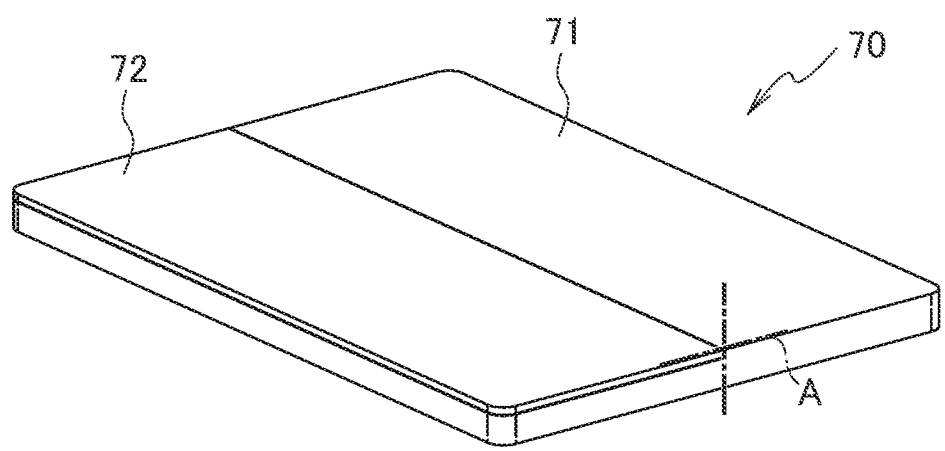
FIG. 11 shows another electronic device applied with a hinge according to the present embodiment.
Figure 11:
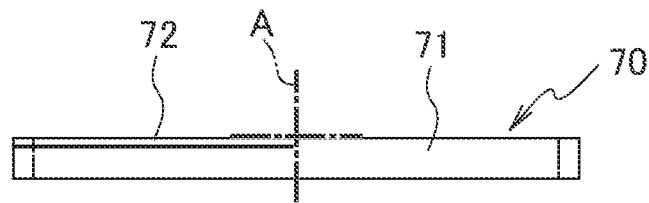
Figure 12:
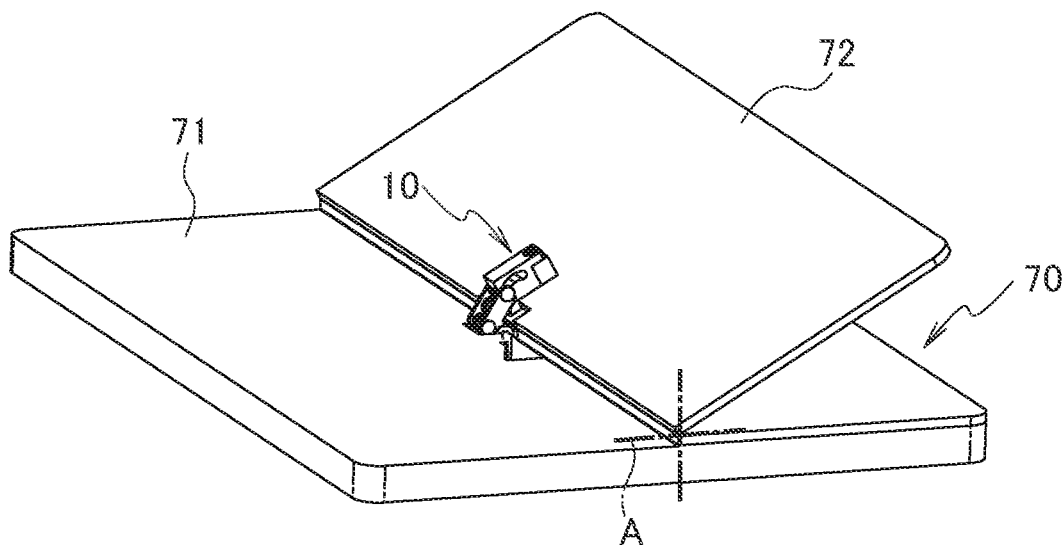
FIG. 12 shows another electronic device applied with a hinge according to the present embodiment.
Figure 12:
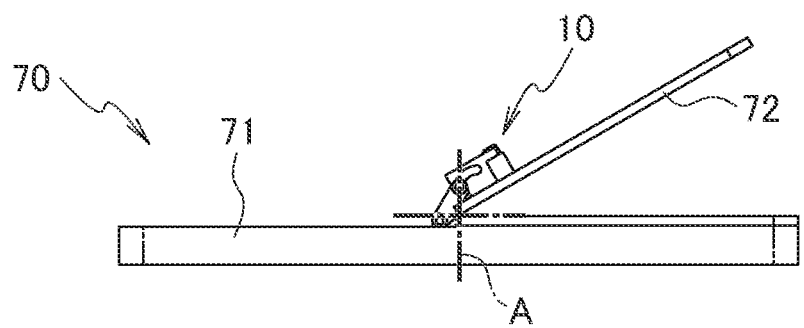
Figure 13:
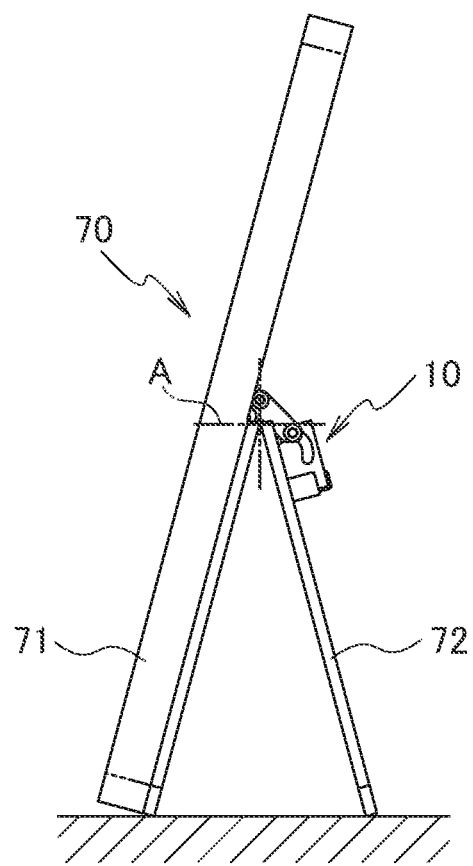
FIG. 13 shows another electronic device applied with a hinge according to the present embodiment.

FIGS. 11 to 13 are diagrams showing another electronic device 70 applied with the hinge 10 according to the present embodiment. The electronic device 70 includes a substantially rectangular plate-shaped housing 71, and a plate-shaped support plate 72 which is thinner than the housing 71, has substantially the same size as the divided back surface of the housing 71, and is rotatably connected by the hinge 10 according to the present embodiment at a connecting portion extending along the substantial center of a back surface of the housing 71 in the longitudinal direction so as to divide the back surface into approximately two back surfaces. The electronic device 70 may be a tablet computer provided with a display such as an LCD or a touch panel on a front surface thereof.

FIG. 11 shows the electronic device 71 in which the support plate 72 is folded and closed on the back surface of the housing 70. FIG. 11(a) is a perspective view and FIG. 11(b) is a left side view. For the convenience, an upper side of each of FIG. 11(a) and FIG. 11(b) shows the back surface of the housing 71 of the electronic device 70, and alternatively a lower side of each of the diagrams shows the front surface of the housing 71. The same applies to FIG. 12 also. In order to use the support plate 72, FIG. 12 shows the electronic device 70 in which the support plate 72 is raised to form a predetermined angle with the back surface of the housing 71. FIG. 12(a) is a perspective view, and FIG. 12(b) is a left side view. FIG. 13 is a right side view showing a state where the support plate 72 is opened and separated from the back surface of the housing 71 of the electronic device 70 to form a predetermined angle therebetween, and the electronic device 70 is placed on a horizontal surface such as a desk so that the electronic device 70 is supported by one edge of the side surface of the housing 71 and one edge of the support plate 72. By placing the electronic device 70 in such a way, for example, the front surface of the housing 71 faces a user who is moving toward the desk, and accordingly, the convenience for the user to use electronic device 70 can be provided.

By using the hinge 10 according to the present embodiment, at the connecting portion extending in the longitudinal direction of the back surface of the housing 71 of the electronic device 70, the support plate 72 rotates relative to the housing 71 about the center of the back surface of the housing 71 and the facing end of the support plate 72 as the virtual rotation axis A such that an interval between the back surface of the housing 71 and the facing end of the support plate 72 are kept to be constant. As shown in FIG. 11, in the hinge 10 according to the present embodiment, when the support plate 72 is fully folded to cover the back surface of the housing 71, the shaft of the rotary shaft does not protrude from the back surface of the housing 71 or the support plate 72. Therefore, effective areas of the back surface of the housing 71 and the support plate 72 can be ensured, and also, various designs are possible. The hinge 10 according to the present embodiment can provide a click with sufficient strength at predetermined rotation angles of the housing 71 and the support plate 72, and provide the convenience when the housing 71 and the support plate 72 are rotated. Further, the hinge 10 according to the present embodiment has the durability to withstand a large number of opening/closing movement, and can stably operate over a long period of time.

FIGS. 10 to 13 show an example in which the hinge 10 according to the present embodiment is applied to an electronic device, but an application range of the hinge 10 according to the present embodiment is not limited to this. For example, the present invention can be applied to a target object having a structure of connecting the first member and the second member so that the first member and the second member are rotatable about the virtual rotation axis, such as furniture doors like a cabinet a music stand the like.

Figure 14:
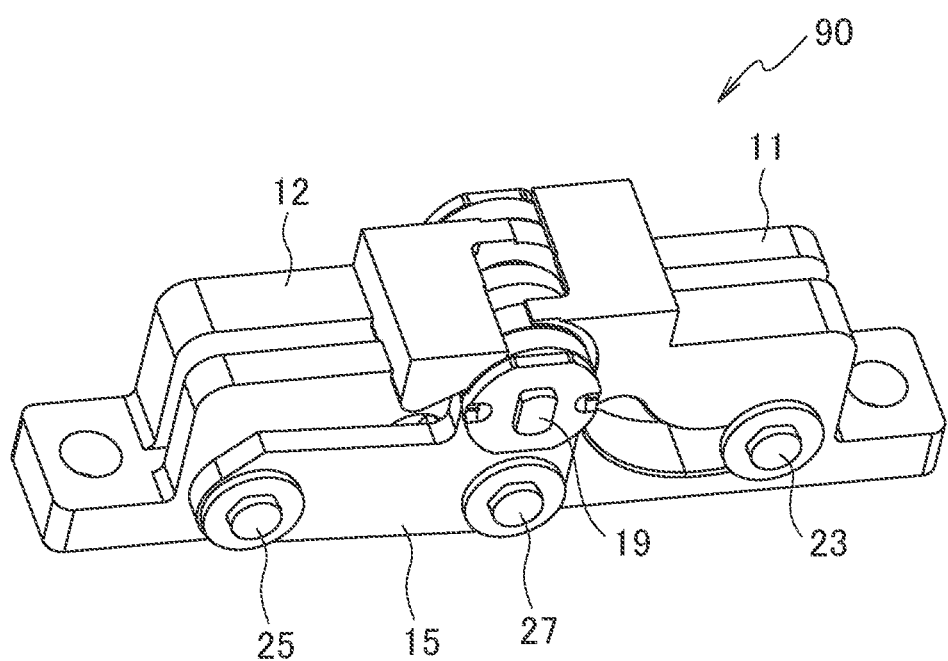
FIG. 14 is a perspective view of a hinge according to a first modified example.
Figure 15:
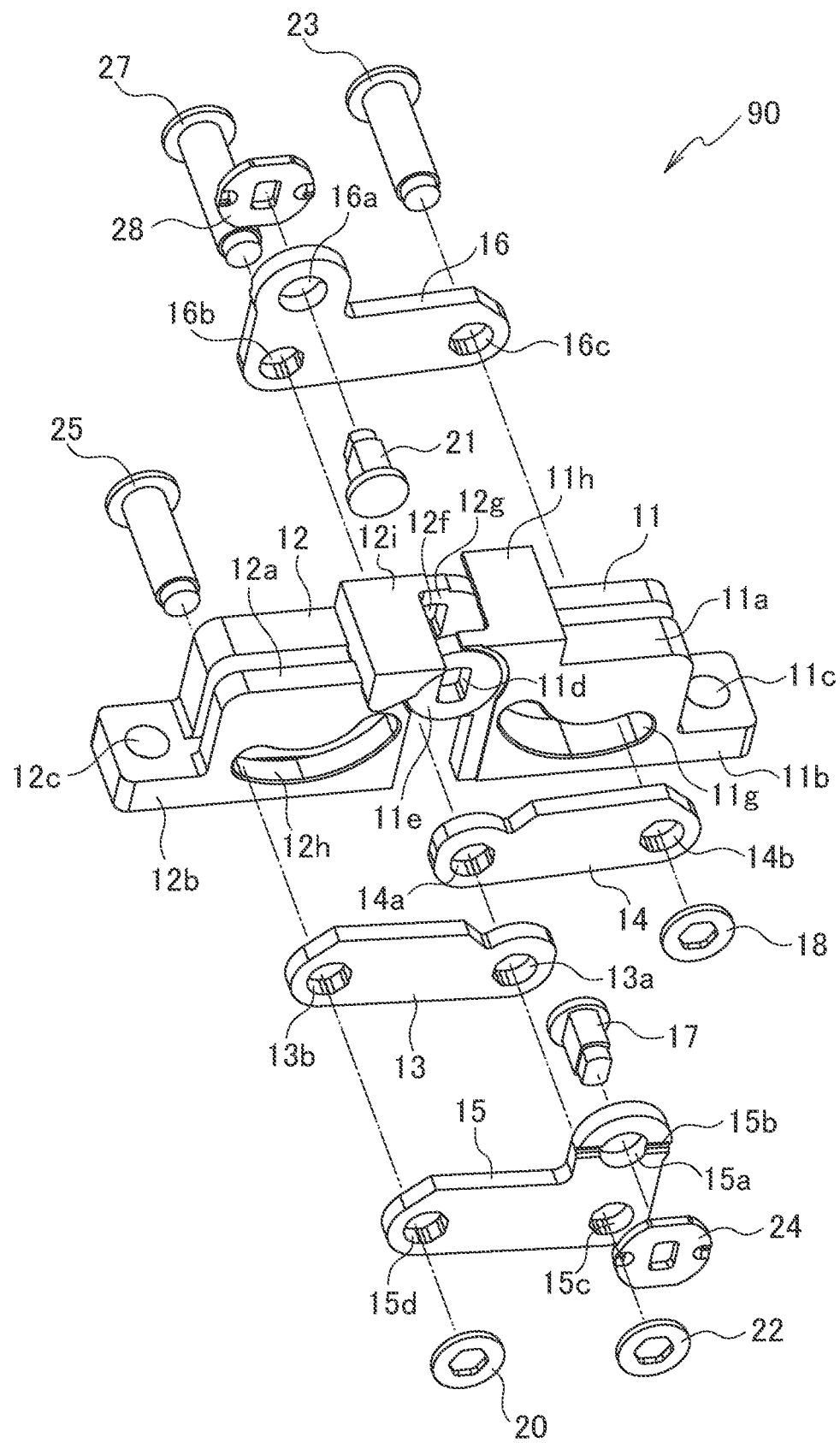
FIG. 15 is an exploded view of a hinge according to a first modified example.

FIG. 14 is a perspective view showing a hinge 90 according to a first modified example. FIG. 15 is an exploded view of the hinge 90 according to the first modified example. The same parts as those of the hinge 10 according to the present embodiment in the hinge 90 according to the first modified example are denoted with the same reference numerals, and the descriptions thereof are omitted.

The first case 11 has the main body 11a having a predetermined cavity inside, and has, at an end of one side surface (a side surface on a front side of the diagram) of the main body 11a, the ear 11e with the insertion hole 11d through which the first hinge shaft 17 is inserted. In the second case 12, on the other end of one side face (a side surface on a back side of the diagram) of the main body 12a, formed is the second ear 21g with the second insertion hole 12f through which the third hinge shaft 21 is inserted. The modified example does not provide the second hinge shaft 19 and the first ear 12e having the first insertion hole 12d through which the second hinge shaft 19 is inserted of the hinge 10 according to the present embodiment. Further, the groove 15b is not formed on the surface of the ear 11e of the first case 11. In the hinge 90 according to the first modified example, the third hinge shaft 21 is the only hinge shaft for supporting the second case 12 and corresponds to the second hinge shaft 19 of the present embodiment.

The second center plate 14 has a shape extending in one direction, and has, at a portion near one end, a first insertion hole 14a through which the center shaft 27 is inserted, and at a portion near the other end, a second insertion hole 14b through which the first link shaft 23 is inserted. A first hinge shaft 17 is inserted into a first insertion hole 15a at a portion near an end of a short side of the first side plate 15, and a second link shaft 25 is inserted into a third insertion hole 15d at a portion near an end of a long side of the first side plate 15.

In a link mechanism of the hinge 90 according to the first modified example, a first center plate 13 that is a third plate connects the second link shaft 25 and the center shaft 27, and a second center plate 14 that is a fourth plate connects the first link shaft 23 and the center shaft 27. The first side plate 15 that is the first plate connects the first hinge shaft 17, the second link shaft 25, and the center shaft 27, and the second side plate 16 that is the second plate connects the third hinge shaft 21, the first link shaft 23, and the center shaft 27.

In the hinge 90 according to the first modified example also, the link mechanism enables the rotation of the first case 11 and the second case 12 about the virtual rotation axis. In the hinge 90 according to the first modified example also, a first torque generating mechanism that generates a torque for the rotation of the first case 11 is realized by a two-side chamfered first hinge shaft 17, a first case 11 with the insertion hole 11d at which the first hinge shaft 17 is engaged, a first side plate 15 with a groove 15b across the first insertion hole 15a formed on a surface (a surface on a front side of the diagram), and the first click plate 24 engaged with the first hinge shaft 17. Similarly, a third torque generating mechanism that generates a torque for the rotation of the second case 12 is realized by the third hinge shaft 21, the second case 12, the second side plate 16 formed with a groove across the first insertion hole 16a on an unillustrated surface (a surface on a back side of the diagram), and the third click plate 28. In the hinge 90 according to the first modified example also, the first click plate 24 and the third click plate 28 can provide the strong elastic force by the leaf spring in the axial direction of the first hinge shaft 17 and the third hinge shaft 21, and accordingly, a click with sufficient strength can be provided at specific rotation angles of the first case 11 and the second case.

Figure 16:
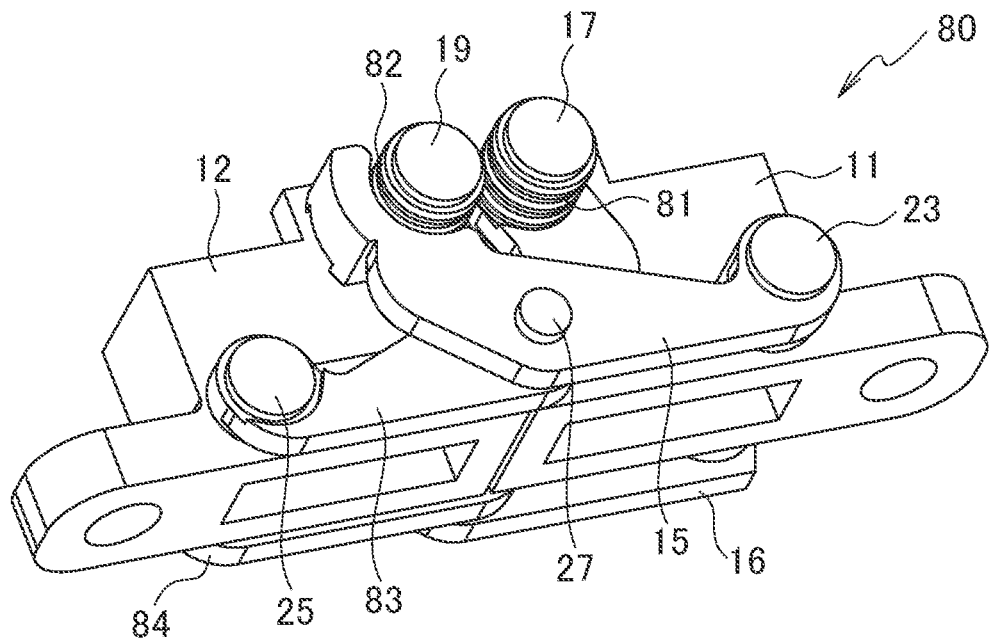
FIG. 16 is a perspective view of a hinge according to a second modified example.
Figure 16:
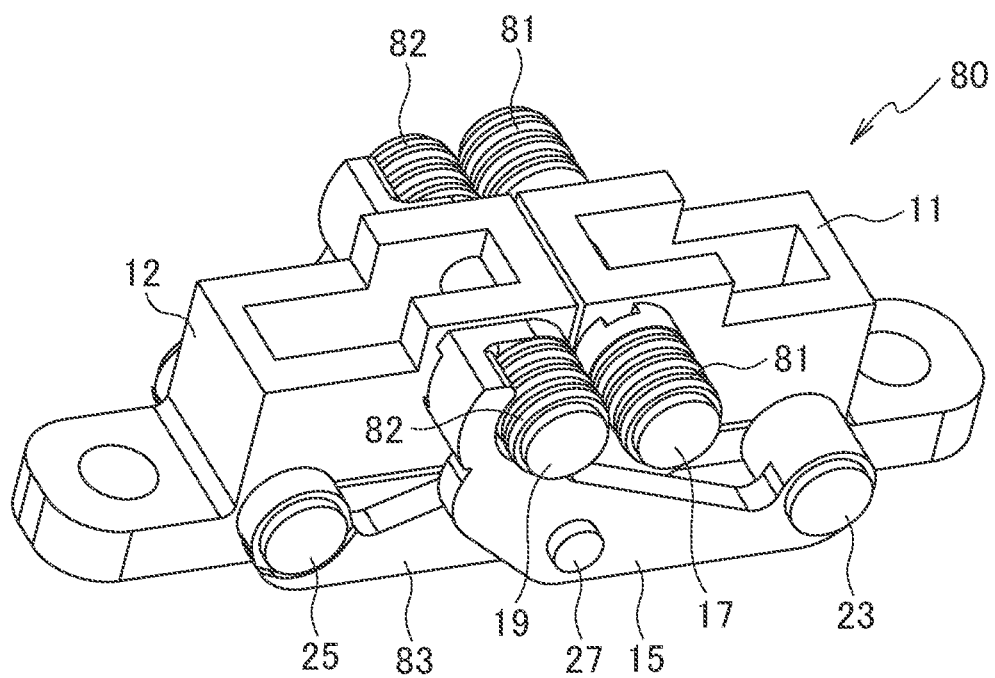

FIG. 16 is a perspective view showing a hinge 80 according to a second modified example. FIGS. 16(a) and 16(b) are perspective views of the hinge 80 as viewed from different directions. The hinge 80 according to the second modified example is different from the hinge 10 according to the present embodiment in that the energizing means of the torque generating mechanism is changed and is different from the first click plate 24, the second click plate 26, and the third click plate 28 to disc springs 81 and 82, that is a spring is changed from the leaf spring according to the present embodiment to the disc spring. Further, in the second modified example, the coaxial second hinge shaft 19 and the third hinge shaft 21 of the hinge 10 according to the present embodiment are replaced to a single second hinge shaft 19, and the first center plate 13 and the second center plate 14 are replaced to a third side plate 83 and a fourth side plate 84. Shapes of the guide grooves of the first case 11 and the second case 12 that respectively guide the first link shaft 23 and the second link shaft 25 are also differentiated. Other configurations except above are the same as those of the hinge 10 according to the present embodiment, and thus, parts common to those of the hinge 10 according to the present embodiment 10 are denoted with the same reference numerals of the diagrams.

In the hinge 80 according to the second modified example also, as in the hinge 10 according to the present embodiment, the first member and the second member can be supported so as to be rotatable about the virtual rotation axis each other. Further, the disc springs 81 and 82 can provide the strong elastic force by the disc springs in the axial direction of the first hinge shaft 17 and the second hinge shaft 19 respectively, and thus, a click with sufficient strength can be provided, as in the hinge 10 according to the present embodiment.

Figure 17:
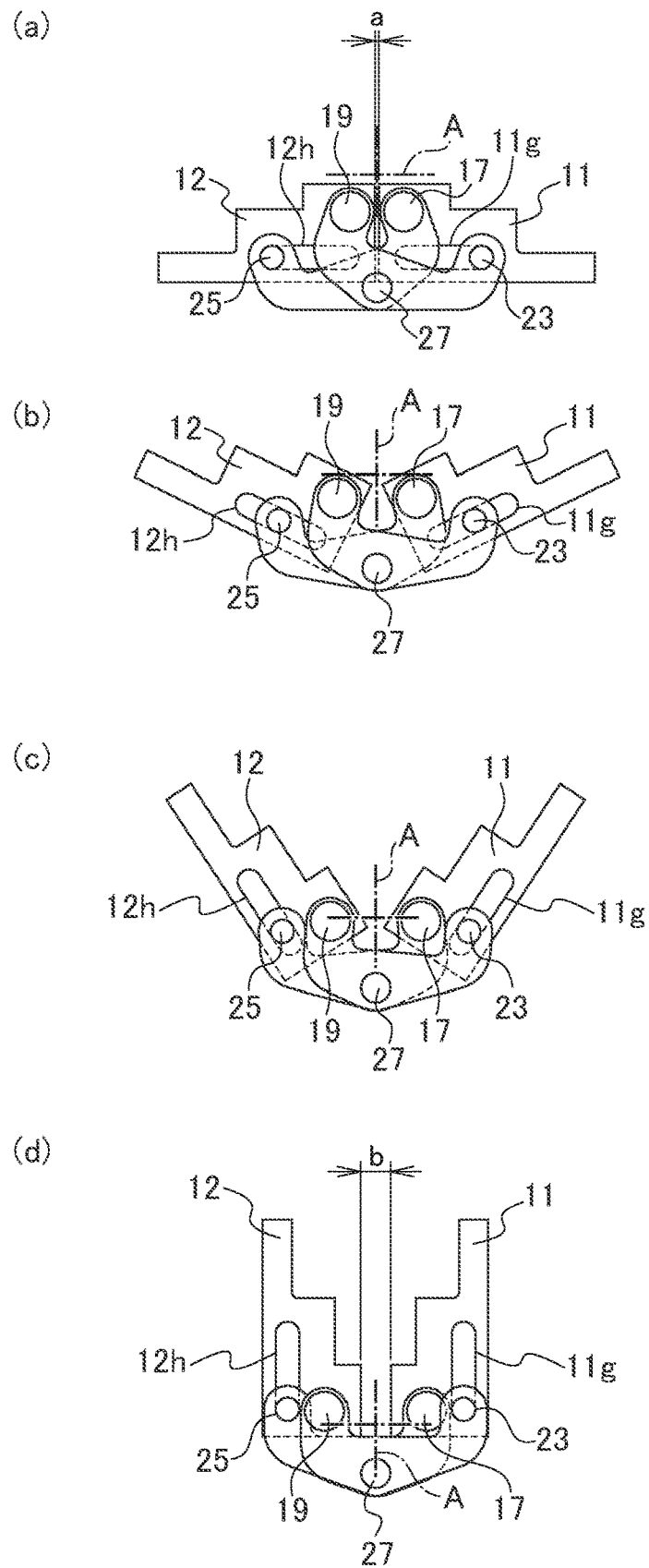
FIG. 17 is a front view showing movement of a link mechanism of a hinge according to the second modified example.

FIG. 17 is a front view showing movement of the link mechanism of the hinge 80 according to the second modified example. The opening/closing of the hinge 80 according to the second modified example is also in accordance with the opening/closing of the first member and the second member (not shown) attached to the upper surface of the first case 11 and the upper surface of the second case 12 respectively, as in the opening/closing of the hinge 10 according to the present embodiment. The movement of the link mechanism according to the second modified example are also similar to the movement of the link mechanism of the hinge 10 according to the present embodiment shown in FIG. 4.

FIG. 17(a) shows a completely opened state of the hinge 80 according to the second modified example, FIG. 17(b) shows a slightly closed state of the hinge 80 according to the second modified example, FIG. 17(c) shows a further closed state of the hinge 80 according to the second modified example, and FIG. 17(d) shows a completely closed state of the hinge 80 according to the second modified example. In all of FIGS. 17(a) to 17(d), the first case 11 and the second case 12 rotate about the virtual rotation axis A. An interval between the first case 11 and the second case 12 that face each other across the virtual rotation axis A gradually increases depending on the rotation angles of the first case 11 and the second case 12 in a range from "a" in the completely opened state shown in FIG. 17(a) to "b" in the completely closed state shown in FIG. 17(d).

The relationship between the rotation angles of the first case 11 and the second case 12, and the interval between the first case 11 and the second case 12 that face each other across the virtual rotation axis A can be set depending on the shapes of the guide groove 11g of the first case 11 and the guide groove 12h of the second case 12. In the second modified example, as the hinge 80 is opened, the interval between the first case 11 and the second case 12 that face each other across the virtual rotation axis A is set to increase further.

INDUSTRIAL APPLICABILITY

A hinge according to the present embodiment can be used to, for example, an electronic device such as a foldable mobile phone or a notebook computer which is constituted by rotatably connecting a first housing and a second housing each other.

DESCRIPTION OF REFERENCE NUMERALS

11. First case
12. Second case
13. First center plate
14. Second center plate
15. First side plate
16. Second side plate
17. First hinge shaft
19. Second hinge shaft
21. Third hinge shaft
23. First link shaft
25. Second link shaft
27. Center shaft

The invention claimed is:
1. A hinge (10, 80) that supports a first member and a second member such that the first member (51) and the second member (52) are rotatable about a virtual rotation axis (A), the hinge (10, 80) comprising:
- a first hinge shaft (17) parallel to the virtual rotation axis (A);
- a second hinge shaft (19) parallel to the virtual rotation axis (A);
- A first link shaft (23) parallel to the virtual rotation axis (A);
- a second link shaft (25) parallel to the virtual rotation axis (A);
- a center shaft (27) parallel to the virtual rotation axis (A);
- a first case (11) attached with the first member (51), the first case including an insertion hole (11d) through which the first hinge shaft (17) is inserted, and a guide groove (11g) that guides the first link shaft (23);
- a second case (12) attached with the second member (52), the second case including an insertion hole (12d) through which the second hinge shaft (19) is inserted, and a guide groove (12h) that guides the second link shaft (25); and
- a first plate (14, 84) including an insertion hole (14a) through which the first hinge shaft (17) is inserted, an insertion hole (14c) through which the second link shaft (25) is inserted, and an insertion hole (14b) through which the center shaft (27) is inserted; and
- a second plate (15) including an insertion hole (15a) through which the second hinge shaft (19) is inserted, an insertion hole (15d) through which the first link shaft (23) is inserted, and an insertion hole (15c) through which the center shaft (27) is inserted.

2. The hinge (10, 80) according to claim 1, wherein the guide groove (11g) of the first case (11) and the guide groove (12h) of the second case (12) are shaped to be symmetrical in a plane passing through the virtual rotation axis (A) and an axis of the center shaft (27).

3. The hinge (10, 80) according to claim 1, wherein an axis of the first hinge shaft (17), an axis of the second hinge shaft (19), an axis of the first link shaft (23), an axis of the second link shaft (25), and the axis of the center shaft (27) are arranged to be symmetrical in the plane passing through the virtual rotation axis (A) and the axis of the center shaft (27).

4. The hinge (10, 80) according to claim 1, wherein the guide groove (11g) of the first case (11) and the guide groove (12h) of the second case (12) guide the first link shaft (23) and the second link shaft (25) respectively along a predetermined path in a plane orthogonal to the virtual rotation axis (A) so that the first case (11) and the second case (12) are rotatable about the virtual rotation axis.

5. The hinge (10, 80) according to claim 1, wherein the first case (11) and the second case (12) are synchronized such that the first case (11) and the second case (12) are symmetrical in the plane passing through the virtual rotation axis (A) and the axis of the center shaft (27), irrespective of a rotation angle.

6. The hinge (10, 80) according to claim 1, wherein the first case (11) further comprises a stopper that limits a rotation angle of the first plate (14, 84) about the first hinge shaft (17) inserted into the insertion hole (11d) of the first case to be in a predetermined range, and the second case (12) further comprises a stopper that limits a rotation angle of the second plate (15) about the second hinge shaft (19) inserted into the insertion hole (12d) of the second case to be in a predetermined range.

7. The hinge (10, 80) according to claim 1, further comprising:
- a first torque generating mechanism that generates a torque for a rotation between the first case (11) and the first plate (14, 84) about the first hinge shaft (17); and
- a second torque generating mechanism that generates a torque for a rotation between the second case (12) and the second plate (15) about the second hinge shaft (19).

8. The hinge (10, 80) according to claim 7, wherein each of the first torque generating mechanism and the second torque generating mechanism comprises a leaf spring or a disc spring as energizing means.

9. The hinge (10) according to claim 1, further comprises a third plate (16) including an insertion hole (16c) through which the first link shaft (23) is inserted and an insertion hole (16b) through which the center shaft (27) is inserted; and
- a fourth plate (13) including an insertion hole (13b) through which the second link shaft (25) is inserted and an insertion hole (13a) through which the center shaft (27) is inserted.

10. The hinge (80) according to claim 1, further comprises:
- a third plate (83) including an insertion hole through which the first hinge shaft (17) is inserted, an insertion hole through which the second link shaft (25) is inserted, an insertion hole through which and the center shaft (27) is inserted;
- and a fourth plate (16) including an insertion hole (16a) through which the second hinge shaft (19) is inserted, an insertion hole (16c) through which the first link shaft (23) is inserted, and an insertion hole (16b) through which the center shaft (27) is inserted.

* * * * *